March 23, 1965 TAKURO SUDO ETAL 3,174,341
HIGH-SPEED ROTATING APPARATUS
Filed Nov. 20, 1962

LEGEND
—○— OSCILLATION VOLTAGE
—×— SOLAR BATTERY GENERATED VOLTAGE
------ OSCILLATION FREQUENCY

United States Patent Office 3,174,341
Patented Mar. 23, 1965

3,174,341
HIGH-SPEED ROTATING APPARATUS
Takuro Sudo, Musashino-shi, Tokyo-to, Saburo Chiba, Setagaya-ku, Tokyo-to, and Yasuyuki Goto, Akishima-shi, Tokyo-to, Japan, assignors to Kabushiki Kaisha Hitachi Seisakusho, Marunouchi, Chiyoda-ku, Tokyo-to, Japan, a joint-stock company of Japan
Filed Nov. 20, 1962, Ser. No. 239,401
Claims priority, application Japan, Nov. 22, 1961, 36/41,758
4 Claims. (Cl. 73—351)

This invention relates to high-speed rotating apparatuses, and more particularly it relates to a new high-speed rotating apparatus provided with a unique and effective temperature-detecting system.

In such a high-speed rotating apparatus as an ultracentrifuge, wherein various macromolecular solutions or collodial solutions are subjected to high centrifugal force to accomplish separation and refinement of fine particles, or wherein, by optically measuring the velocity of movement of molecules within a solution placed in a centrifugal field and a concentration distribution of the said molecules within the solution, the molecular weights and distribution of molecular weights of the molecules are determined, the detection and control of the sample temperature are important requirements. In spite of these requirements, problems such as those described hereinbelow arise, and the detecting of the temperatures within such a high-speed rotating apparatus has heretofore been extremely difficult.

That is, while the velocity of movement of the above-mentioned solute molecules varies with variation in such factors as the magnitude of the centrifugal force, the concentration, and the temperature, a high centrifugal force is considered to be necessary for separating solute molecules of especially low molecular weights. To satisfy this requirement, it would be necessary to exert, continuously, a centifugal force of the order of approximately $2.6 \times 10^8$ gram.centimeter.second$^{-2}$, ordinarily, with a practical ultracentrifuge. From this necessity, such difficulties as the following two arise. In the first place, a temperature-detecting element for temperature measurement which is to be attached to such a high-speed rotating body must be capable of withstanding such high-speed rotation as described above and must detect temperatures accurately. In the second place, the temperature-detecting signal output from the temperature-detecting element provided on the rotating body must be transmitted in a relatively easy manner to a temperature indicating and controlling device fixed on the outside of the rotating body.

It is a prime object of the present invention to solve the above-described problems.

It is a specific object of the invention to provide a new high-speed rotary machine provided with an effective thermometric device.

The nature, principle, and details of the invention will be more clearly aparent from the following detailed description of one representative embodiment of the invention taken in conjunction with the accompanying drawings in which like parts are designated by like reference numerals and letters, and in which.

Figure 1:
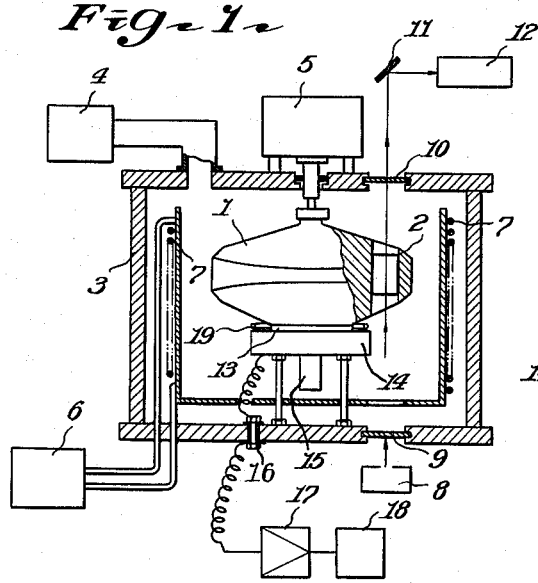
FIG. 1 is an elevational view, partly in section with parts cut away, and partly in schematic form, showing the embodiment.

Referring to FIG. 1, the principal mechanical part of the embodiment shown, which is in the form an ultracentrifuge, is a rotor 1 provided with a sample cell 2 which is for containing a sample and is transparent in the direction parallel to the rotor axis. The rotor 1 is enclosed by and supported rotatably in an airtight housing or chamber 3, the interior of which is evacuated by a vacuum pump 4 to approximately $10^{-3}$ mm. Hg vacuum so as to facilitate the high-speed rotation of the rotor. The rotor 1 is rotationally driven by a driving system 5 coupled thereto and is cooled by a cooling coil 7 which is disposed about, but somewhat separated from, the rotor 1, and which is connected to a cooling device 6. The vacuum chamber 3 is further provided on its upper and lower walls with optical windows 10 and 9, which are so disposed on the same vertical axis passing through the sample cell 2 that light emitted from a light source 8 for sample analysis passes successively through the window 9, the sample cell 2 (and, therefore, the sample), and the window 10 to be projected by way of a reflecting mirror 11 to an optical apparatus 12 for observation and measurement, by which analysis of the sample is accomplished.

Figure 2:
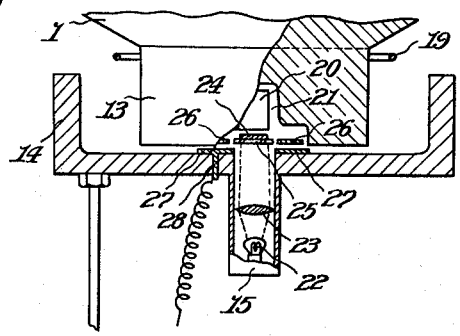
FIG. 2 is an enlarged elevational view, partly in section with parts cut away, showing principal details of the lower part of the embodiment of FIG. 1.

The rotor 1 is provided at its base part with a temperature-detecting oscillator 13, the constructional details of which are shown in FIG. 2. An insulating platform 14 which supports a solar-battery 24, light source container 15 below and coaxially with the oscillator 13 is rigidly mounted on a support fixed to the bottom of the vacuum chamber 3. The output of the oscillator 13 is led out through an airtight, insulated terminal 16 provided on a wall of the vacuum chamber 3 to an amplifying device 17. The output of this amplifying device 17 is transmitted to a temperature-measuring device 18, which measures the sample temperature through the frequency of a temperature-detection signal. The details of temperature-measuring system will be described in detail hereinafter. Although the specific details are not indicated in the drawings, it will be obvious that it is possible to set and maintain the sample temperature within the rotor at a desired value by adapting the aforsaid cooling device 6 and a heating device 19 having a ring-shaped heating element to be controlled by the output of the aforesaid temperature-measuring device 18.

The detector of the apparatus according to the invention consists of an electronic oscillator. Since means are provided to cause a signal to be transduced by deviations in the oscillation frequency of this electronic oscillator, it is possible to use an electrostatic coupling system of relatively simple arrangement as the coupling means, necessary for transducing oscillation power, between the rotor and the stationary part of the apparatus. Although various transducing methods, such as an electro magnetic coupling method or a method wherein oscillation power is caused to be radiated by means of an antenna and received on the stationary side, may be considered for adoption as the aforesaid coupling means, an electrostatic coupling system formed merely by mutually-facing, parallel electrode plates is used in apparatus of this invention. Accordingly, it is an advantageous feature of the invention that a simple construction suffices for this coupling means.

Furthermore, since the detector oscillator of the apparatus of this invention is adapted to utilize a photocell such as, for example, a solar battery, which is capable of withstanding high-speed rotation and is, moreover, of small size, as its power source, it does not require a coupling means or wire especially for receiving power from outside of the high-speed rotating body. Moreover, this oscillator has a circuit arrangement enabling it to operate with ample stability by means of low output such as that of a solar battery as will be described in greater detail hereinafter.

This important detector oscillator, its power source, and the oscillation power transducing system will now be described in detail. Referring to FIG. 2, which shows the details of the afore-mentioned solar-battery light source section and the detector oscillator section provided in the base part of the rotor, the detector oscillator proper 20 is installed in a hollow 21 formed in the bottom of the rotor base, coaxially at the center of rotation. Accordingly, in spite of the high-speed rotation of the rotor, this oscillator 20 is unaffected by this rotation. For the power source for the detector oscillator, there is provided, at the base part of the rotor, a solar battery 24, which is adapted to be constantly irradiated by light from a light source 22 through a lens 23, the said light source 22 and lens 23 being enclosed and supported in the afore-mentioned light source container 15. The solar battery 24 is protected by a protective, transparent glass plate 25 disposed therebelow.

The output of the detector oscillator is led out, through an electrostatic coupling consisting of a ring-shaped, planar electrode 26 fixed coaxially to the bottom of the rotor base and an electrode 27 fixed to the insulating platform 14 in a disposition which is parallel to and coaxially facing the said electrode 26, then through an electrostatic coupling output terminal 28, to the afore-mentioned temperature-measuring device.

Figure 3:
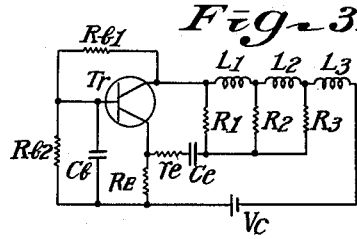
FIG. 3 is an electrical circuit diagram showing the composition and arrangement of one example of an oscillator for temperature measurement suitable for use in the present invention.

One example of an oscillator of impedance tapered, three parallel phase-shift, R-L type which is suitable for use as the detector oscillator of this invention is illustrated in FIG. 3 and is arranged in the following manner. A phase-shift type, R-L circuit composed of resistance elements $R_1$, $R_2$, and $R_3$ and inductance elements $L_1$, $L_2$, and $L_3$ is inserted between the collector output side and emitter input side of a base-grounded type transistor $T_r$ so as to constitute a positive feedback circuit on the emitter side and form a current type amplification section. At the same time, the value of each of the time constants $L_1/R_1$, $L_2/R_2$, and $L_3/R_3$ of the circuit elements is suitably selected so as to cause the necessary amplification of the feedback circuit to be less than unity and the phase-shift to be zero. Accordingly, the instant circuit is an extremely effective circuit as a detector oscillator for the apparatus of the present invention because it possesses the following characteristic features.

(1) Since this circuit incorporates a base-grounded type, single-stage amplification circuit, its composition is simple and requires small physical space, as in the case of the single-base-common type transistor, R-C and R-L oscillators described in the specification of Japanese patent application No. 39,034/1960. At the same time, moreover, the operation of this circuit is extremely stable. For example, the operation can be easily maintained with a stability corresponding to a frequency deviation of the order of $$\frac{\partial f}{f} \leq 1 \times 10^{-3}$$

with respect to a variation in irradiation of the order of ±20 percent of the light source for irradiation of the solar battery. Therefore, it is possible to utilize a relatively high signal-noise ratio.

(2) Because an R-L circuit is used for the phase-shift circuit, and power is supplied through the inductance L, a low direct-current voltage drop due to the load of the amplification section suffices. Accordingly, since it is possible to use a low power-source voltage, a solar battery can be used as a power source capable of withstanding high-speed rotation, and the circuit can be operated with the low output power of this solar battery with ample stability. Such a circuit requiring no wire from the outside is extremely advantageous and effective as an oscillator installed in a high-speed rotating part.

(3) By using thermistors for the resistance element R of the above-described R-L circuit, the necessity of using a special temperature-detecting element is obviated, wherefore the circuit composition can be further simplified. Furthermore, the frequency condition of the instant circuit becomes that representable by the following equation.

$$(2f)^2 = \frac{1}{\tau_1 \tau_2}\left[\left(\frac{R_3}{R_2}+\frac{R_3}{R_1}+1\right)+\frac{\tau_2}{\tau_3}\left(1+\frac{R_2}{R_1}+\frac{1}{2}\right)\right]$$

where $f$ is the oscillation frequency, and $$\tau_1 = \frac{L_1}{R_1},\ \tau_2 = \frac{L_2}{R_2},\ \tau_3 = \frac{L_3}{R_3}$$

If each of the inductances $L_1$, $L_2$, and $L_3$ are constant, and each of the resistance elements $R_1$, $R_2$, and $R_3$ is a thermistor selected to have a suitable value, the rates of variation of resistance of these thermistors will be the same when the surrounding atmospheric temperature changes, and the above equation becomes:

$$f^2 \propto \frac{1}{R_1 R_2} \cdot k$$

where $k$ is a constant.

As is apparent from this equation, the oscillation frequency will then vary linearly with the temperature, whereby the design of the temperature-detecting circuit will be facilitated.

(4) Furthermore, because the detector oscillator is assembled in a micro-miniaturized manner, and the entire oscillator including the thermistors which constitute the main temperature detection device is adapted to operate as a temperature detector, the drift characteristics of the oscillation frequency with respect to temperature variation of the transistor circuit itself, when the said thermistors are considered to be resistance elements which are unrelated to temperature, need not always be flat. That is, even if the above-said drift characteristics exist, the temperature characteristic due to the use of thermistor of high temperature coefficient for the resistance element R has a higher absolute value and, moreover, corresponds to a straight line having a steep slope, and its oscillation frequency characteristics has a substantially constant tendency with respect to temperature variation. For this reason, temperature compensation of the transistor circuit itself is not especially required, wherefore the design is facilitated.

Figure 4:
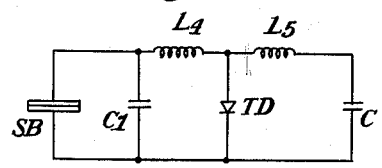
FIG. 4 is an electrical circuit diagram showing another example of an oscillator for temperature measurement suitable for use in the present invention.

Another example of a practical circuit suitable for the detector oscillator of the instant apparatus, as shown in FIG. 4, is an L-C type oscillator comprising a tunnel diode TD, inductances $L_4$ and $L_5$, capacitors $C_1$ and C, and a solar battery SB. This circuit has the following characteristic features.

(1) The composition of this circuit is simple, and the oscillation frequency can be easily maintained constant because the negative-resistance characteristics of the tunnel diode TD are relatively stable with respect to temperature. Especially, since the working voltage of this tunnel diode is low, it is possible to use an extremely miniature power source.

(2) Since an L-C oscillation circuit is used and adapted to be supplied with power through the elements L, it is possible to use a solar battery for the power source similarly as in the case illustrated in FIG. 3, and a power supply line from the outside is not particularly required.

(3) For the capacitors C, barium titanate porcelain having a dielectric constant which varies, in relatively sharp state, with the temperature variation is used. Therefore, the increment of oscillation frequency, that is, the increment of detection signal, with respect to temperature variation can be made large, as indicated by one example of actual measurement in which a dielectric constant of 1000 pf. at 10 degrees C. became as low as 100 pf. at 85 degrees C. Accordingly, it is possible to make the signal-to-noise ($S/N$) ratio substantially large.

Figure 5:
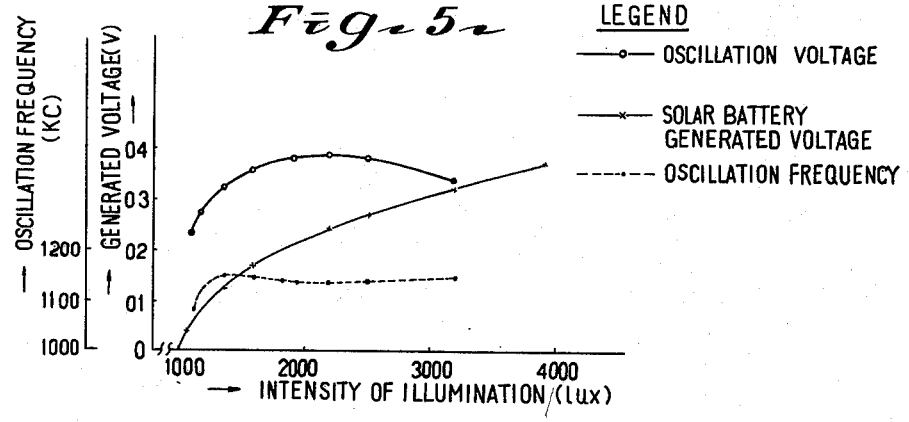
FIG. 5 is a graphical representation indicating the characteristics of the oscillator and power source indicated in FIG. 4.

FIG. 5 shows curves indicating actual measurements of the electromotive force characteristic of the solar battery and the oscillation frequency characteristics and oscillation output characteristic due to the oscillation circuit shown in FIG. 4 with respect to variation in intensity of illumination of a tungsten lamp used as the irradiation source of the solar battery. As shown by these curves, although the electromotive force or voltage of the solar battery varies with variation in intensity of illumination, the curves of oscillation frequency and oscillation amplitude characteristics exhibit substantially level characteristics in the vicinity of an intensity of illumination of approximately 2200 lux. Therefore, when the intensity of illumination is set at approximately 2200 lux, even if some illumination change occurs, fluctuations in the oscillation frequency and the oscillation amplitude due to this illumination change can be kept small. The curves shown in FIG. 5 were obtained by actual measurement in the case of a circuit according to FIG. 4 in which $C_1 = 0.1$ $\mu$f., $C = 50$ pf., $L_1 \doteq 40$ $\mu$h., and $L_2 \doteq 220$ $\mu$h.

The detection signal output obtained in afore-described manner is transmitted, through the electrostatic coupling device consisting of parallel-plate electrodes 26 and 27 and the terminal 28, to the alternating-current amplifying device 17. This alternating-current amplifying device 17, as a high-input impedance, minimizes the reactance effect of the aforesaid electrostatic coupling device. The sample temperature is measured through the magnitude of the output of the amplifying device 17. At the same time, this output can be utilized to control the sample temperature to any desired value as was described hereinbefore.

As is apparent from the foregoing description, the apparatus of this invention is provided with a microminiature oscillator of L-R or L-C type which has relatively high operational stability and temperature-detecting sensitivity, and which is easily operated by an extremely low voltage, and with a solar battery for the power source of this oscillator. Moreover, the output of this oscillator is led out through a simple, electrostatic coupling device. Accordingly, the present invention provides a high-speed rotating apparatus wherein, by means of a relatively simple yet strong construction, measurement and control of the temperature of a sample in its high-speed rotating body can be easily and effectively accomplished.

Since it is obvious that many changes and modifications can be made in the above-described details without departing from the nature and spirit of the invention, it is to be understood that the invention is not to be limited to the details described herein except as set forth in the appended claims.

What is claimed is:

1. A high-speed rotating apparatus comprising a high-speed rotating body, a stationary structure, and a thermometric system for continuously measuring the temperature within the said rotating body, the said thermometric system consisting of a transistor, R-L type oscillator, which is positioned at the central portion of said rotating body, and in which an R-L type passive network composed of at least three stages of temperature-sensitive resistance elements R and inductances L is inserted in the output side and the input side of a single amplifier consisting of one base-grounded type transistor element, a positive feedback is established from one element of the said passive network to the emitter input side, and the impedance ratio of each of the elements of the said passive network is so selected that the required amplification becomes less than unity, a radiation electromotive force device positioned at the central portions of the said rotating body, measuring means provided outside of the said rotating body, and an electrostatic coupling device, consisting of a conductive rotating electrode provided on the said rotating body and a conductive stationary electrode provided on the said stationary structure and disposed to face the said rotating electrode, for leading out the output of the said oscillator to the said measuring means.

2. A high-speed rotating apparatus comprising a high-speed rotating body, a stationary structure, and a thermometric system for continuously measuring the temperature within the said rotating body, the said thermometric system consisting of an L-C type oscillator which is positioned within, and coaxially with the rotational axis of, the said rotating body and is provided with a tunnel diode, inductances L and capacitances C of high capacitance-temperature variation rate, a radiation electromotive force device positioned on, and coaxially with the rotational axis of, the said rotating body, a measuring means provided outside of the said rotating body, and an electrostatic coupling device, consisting of a conductive rotating electrode provided on the said rotating body and a conductive stationary electrode provided on the said stationary structure and disposed to face the said rotating electrode, for leading out the output of the said oscillator to the said measuring means.

3. A high-speed rotating apparatus comprising a high-speed rotating body, a stationary structure, and a thermometric system for continuously measuring the temperature within the said rotating body, the said thermometric system consisting of an L-R type oscillator which is varied in its oscillation frequency in accordance with the temperature variation and is positioned within center portion of the said rotating body, a radiation electromotive force device positioned within the center portion of the said rotating body, measuring means provided outside of the said rotating body, and an electrostatic coupling device consisting of a conductive rotating electrode provided on the said rotating body and a conductive stationary electrode provided on the said stationary structure and disposed to face the said rotating electrode, for leading out the output of the said oscillator to the said measuring means.

4. A high-speed rotating apparatus comprising a high-speed rotating body, a stationary structure, and a thermometric system for continuously measuring the temperature within the said rotating body, the said thermometric system consisting of an L-C type oscillator which is varied in its oscillation frequency in accordance with the temperature variation and is positioned within center porton of the said rotating body, a radiation electromotive force device positioned within the center portion of the said rotating body, measuring means provided outside of the said rotating body, and an electrostatic coupling device consisting of a conductive rotating electrode provided on the said rotating body and a conductive stationary electrode provided on the said stationary structure and disposed to face the said rotating electrode, for leading out the output of the said oscillator to the said measuring means.

References Cited by the Examiner

UNITED STATES PATENTS 2,370,818   3/45   Silverman.
3,029,642   4/62   Burhans et al. _____ 73—362

OTHER REFERENCES

Hiatt, C. W.: Rotor Temperature in the Ultracentrifuge; in Review of Scientific Instruments (24, 2), pp. 182–183, February 1953.

ISAAC LISANN, *Primary Examiner.*